United States Patent
Vetrano et al.

(10) Patent No.: US 6,607,608 B1
(45) Date of Patent: *Aug. 19, 2003

(54) TRANSLATABLE FIBER STRIPPER

(75) Inventors: Carmine J. Vetrano, Medford, MA (US); Robert G. Wiley, Frankfort, KY (US); Matthew W. Reed, Barrington, NH (US)

(73) Assignee: 3SAE Technologies, Inc., Woburn, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/152,885

(22) Filed: May 21, 2002

Related U.S. Application Data

(63) Continuation-in-part of application No. 09/977,107, filed on Oct. 12, 2001, now Pat. No. 6,402,856, which is a continuation-in-part of application No. 09/724,001, filed on Nov. 28, 2000, now abandoned.

(60) Provisional application No. 60/306,843, filed on Jul. 20, 2001, provisional application No. 60/307,297, filed on Jul. 23, 2001, and provisional application No. 60/310,172, filed on Aug. 3, 2001.

(51) Int. Cl.$^7$ .................................................. G08B 5/00
(52) U.S. Cl. .......................... 134/19; 134/31; 134/34; 134/35; 134/37; 134/42; 165/97; 165/110; 165/168; 239/128; 239/132; 239/132.1; 239/133; 239/134; 239/139; 392/480; 392/481; 392/483; 392/485; 392/482; 392/488; 392/489; 34/60; 34/68; 34/380
(58) Field of Search ......................... 34/60, 68, 380; 134/19, 31, 34, 35, 37, 42; 165/97, 110, 168; 239/128, 132, 132.1, 133, 134, 139; 392/480, 481, 483, 485, 487, 488, 489

(56) References Cited

U.S. PATENT DOCUMENTS

| | | | | |
|---|---|---|---|---|
| 3,737,626 A | * | 6/1973 | Davis et al. ................ | 392/484 |
| 4,028,080 A | | 6/1977 | Di Vita et al. .................... | 65/2 |
| 4,725,715 A | * | 2/1988 | Salinier et al. ............. | 392/473 |
| 5,125,980 A | | 6/1992 | Schotter ....................... | 134/15 |
| 5,214,740 A | * | 5/1993 | Carroll ........................ | 392/481 |
| 5,222,180 A | | 6/1993 | Kuder et al. ................ | 385/115 |
| 5,393,136 A | * | 2/1995 | Grabowski et al. ......... | 312/184 |
| 5,526,833 A | | 6/1996 | Crespel et al. ........... | 134/102.1 |
| 5,922,141 A | | 7/1999 | Darsey ........................ | 134/15 |
| 5,939,136 A | | 8/1999 | Cronk et al. ............. | 427/163.2 |
| 5,948,202 A | | 9/1999 | Miller ........................ | 154/344 |
| 5,954,974 A | | 9/1999 | Broer et al. .................... | 216/2 |
| 5,964,957 A | | 10/1999 | Walraven et al. ............. | 134/26 |
| 5,968,283 A | | 10/1999 | Walraven et al. ............. | 134/19 |
| 6,052,880 A | | 4/2000 | Basavanhally .............. | 29/33.5 |
| 6,123,801 A | | 9/2000 | Miller ......................... | 156/344 |
| 6,244,323 B1 | | 6/2001 | Miller ......................... | 156/584 |
| 6,402,856 B1 | * | 6/2002 | Vetrano ....................... | 134/19 |
| 2002/0084066 A1 | * | 7/2002 | Vetrano ....................... | 165/156 |

* cited by examiner

*Primary Examiner*—Sharidan Carrillo
(74) *Attorney, Agent, or Firm*—McDermott, Will & Emery

(57) ABSTRACT

A system for stripping an optical fiber includes a source of air and means for generating very short bursts of air. A heater heats the bursts of air to a temperature sufficient to remove the outer coating from an optical fiber, while maintaining the air isolated from the heat source. A single burst of heated air removes the outer coating of an optical fiber, within less than about one second. A series of closely spaced bursts or a prolonged burst of heated air may be used to remove an expanded length of fiber coating. Stripping may include translation of the fiber or the heater or portions thereof. The stripper may be configured to strip several loaded fibers or a single fiber.

18 Claims, 12 Drawing Sheets

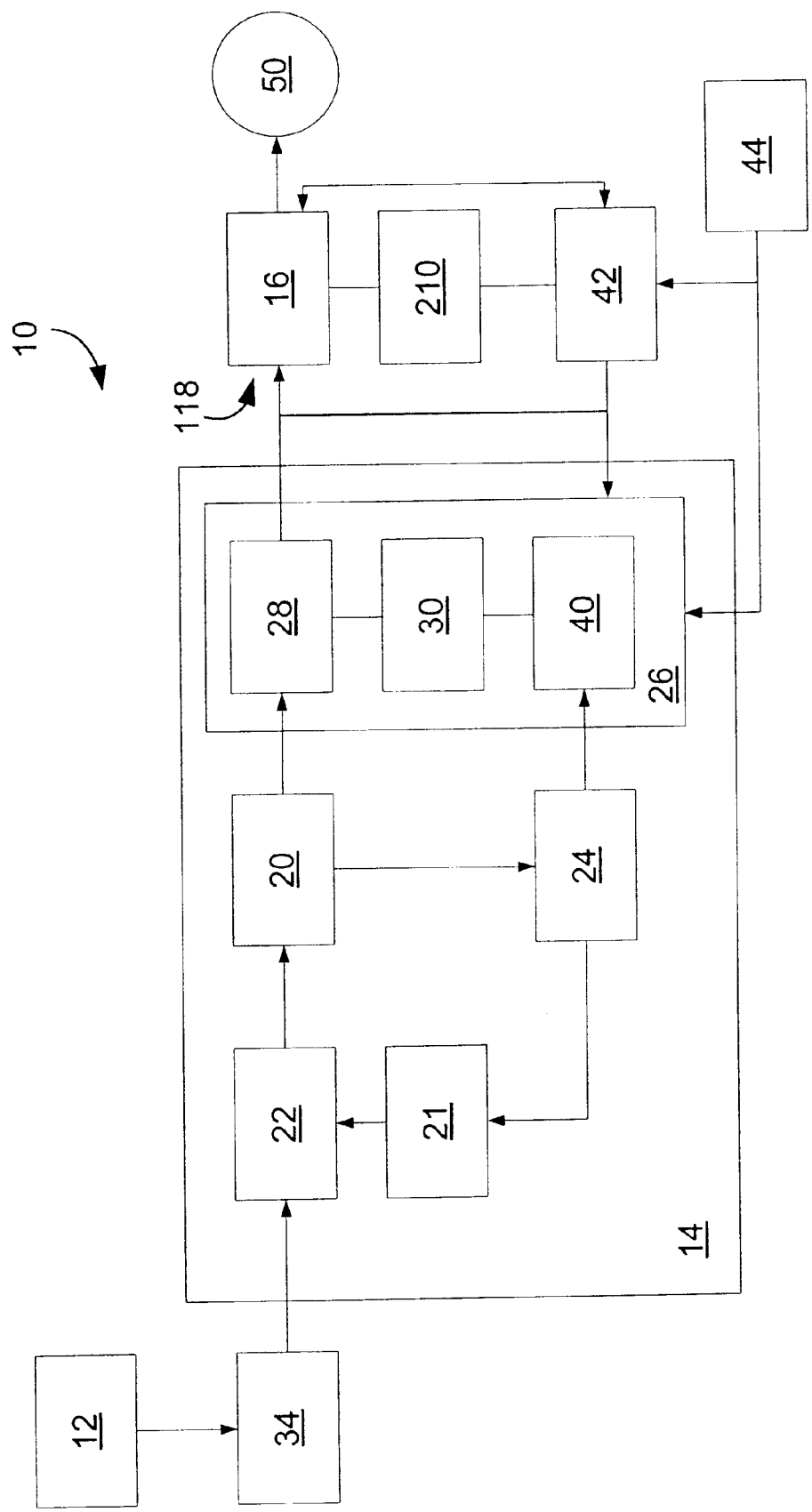

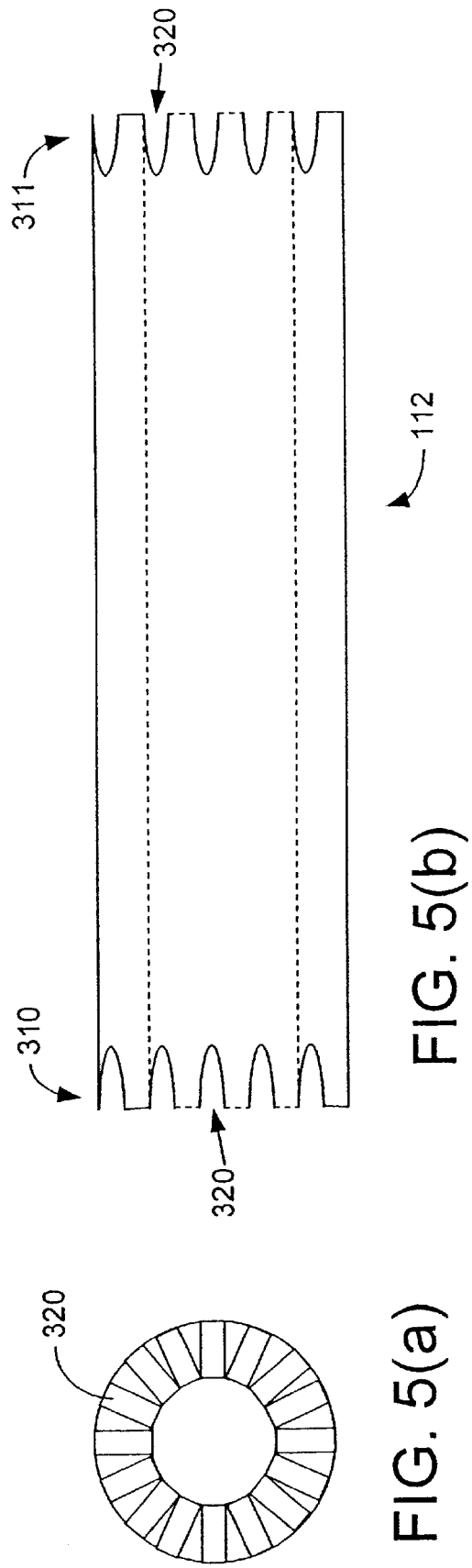

TRANSLATABLE FIBER STRIPPER

CROSS REFERENCES TO RELATED APPLICATIONS

This application is a continiuation-in-part of U.S. Application Ser. No. 09/977,107 filed on Oct. 12, 2001 (now U.S. Pat. No. 6,402,856 B1), which is a continuation in part of Ser. No. 09/724,001, filed on Nov. 28, 2000 (now abandoned), which claimed the benefit of priority from U.S. Provisional Application Ser. No. 60/306,843, filed on Jul. 20, 2001, U.S. Provisional Application Ser. No. 60/307,297, filed on Jul. 23, 2001, and U.S. Provisional Application Ser. No. 60/310,172, filed on Aug. 3, 2001.

STATEMENT REGARDING FEDERALLY SPONSORED RESEARCH

Not applicable.

REFERENCE TO MICROFICHE APPENDIX

Not applicable.

FIELD OF THE INVENTION

This invention relates generally to stripping optical fibers, and in particular to a method and apparatus for rapidly and efficiently stripping optical fibers without using chemicals and without reducing the tensile strength of the fiber.

BACKGROUND

Fiber optic cables are widely used in modern optical devices and optical communications systems. Optical fibers are usually coated with a protective layer, for example a polymer coating, in order to protect the surface of the fiber from chemical or mechanical damage. It is necessary to remove the protective coating in order to prepare the fibers to be cleaved and spliced, or in order to further process the fibers to manufacture optical devices such as optical sensors and other optical communications network components.

Conventional stripping methods include mechanical stripping, chemical stripping, and thermal stripping. These methods all suffer from a number of defects. Mechanical stripping typically involves a stripping tool, similar to a wire stripper, which cuts through the coating and scrapes it off. A major disadvantage is that mechanical stripping typically nicks or scratches the glass fiber surface, eventually leading to cracks and to a degradation in the tensile strength of the fiber. By way of example, the tensile strength of an optical fiber may be reduced from about 15–16 pounds before mechanical stripping to about 3–5 pounds after mechanical stripping. The optical fiber's longevity is thereby reduced.

Chemical stripping uses solvents or concentrated acids to remove the polymer coating. In the prior art, acid stripping is often performed using a sulfuric nitric mixture that includes about 95% sulfuric acid and about 5% nitric acid. While this prior art method reduces tensile strength degradation, an acid residue may typically be left on the fiber surface at the splice point. Therefore, using chemical stripping on titanium dioxide color coded fiber degrades the splice strength. Also, chemical stripping as performed in the prior art is very costly. Finally, there are major safety concerns inherent in chemical stripping methods. Ventilation and safety equipment may be needed when using acids for the stripping process. Human operators performing acid stripping require facilities having well-ventilated areas, preferably with exhaust or ventilation hoods for removing acid fumes. They may also require protective gear, such as protective clothing and gloves for avoiding acid burns, and protective breathing apparatus for protection from acid fumes in the air. Storing, handling, and transporting the acids are also extremely hazardous.

Thermal stripping processes use heat to remove the coating. In particular, hot air stripping methods have been used in the prior art, in which heat (e.g., at about 470° C.) is applied to the polymer coating, causing the polymer coating to heat to a break temperature, at which point the removal of the coating begins. Some prior art hot air stripping methods, such as disclosed for example in U.S. Pat. No. 5,968,283, involve translation of the fiber optical cable. The fiber optical cable is moved over the heat source so that heat directly from the heat source is applied along the optical fiber cable between selected points, causing the corresponding polymer coating to curl and drop off the optical fiber.

These hot air stripping methods suffer from a number of disadvantages. For example, polymer coating curls can remain attached to the fiber optical cable. To prevent the polymer coatings from remaining attached to the optical fiber, it may be necessary to split the polymer coating from the optical fiber at two points, before attempting to curl a section of the polymer coating off the optical fiber. Finally, these prior art methods tend to expose the heated air stream to carbon or oxidizing metals from the heat source, so that particles of carbon or oxidizing metals are deposited on the fiber during the heating process. When such unwanted particles are deposited on the fiber, the tensile strength and performance characteristics of the fiber may be compromised.

Another disadvantage of methods such as the method disclosed in U.S. Pat. No. 5,968,283 is that these methods use a hot air heat source that must generate heat at the break temperature, before starting to heat the polymer coating. This usually requires a flow of hot air for a period of time, before each stripping process begins. Thus, there tends to be a relatively long ramp up time. Devices such as heat shrink guns rated at 1500 Watts, which generate forced air at a temperature of about 470 degrees Celsius, are thus used as the heat source in these prior art methods. When splicing cycles are repeated, the flow of very hot air may be continuous. A continuous flow of very hot air can make it extremely hot and dangerous for the operator and cause a great deal of wasted energy.

It is an object of this invention to provide a method and apparatus for stripping fiber optical cable that do not suffer from the disadvantages described above. In particular, it is an object of this invention to provide a method and apparatus for stripping fiber optical cable without using chemicals, and without reducing the tensile strength of the fiber. It is another object of this invention to provide a method and apparatus for stripping fiber without curling the polymer coating. It is another object of this invention to provide a method and apparatus for stripping fiber more rapidly and efficiently, as compared to prior art methods, and without leaving any coating residues on the fiber. It is yet another object of this invention to provide a method and apparatus for stripping fiber that can be used to strip titanium dioxide color coded fiber, without degrading the splice strength of the fiber. It is yet another object of the present invention to provide and method and apparatus for stripping optical fiber that does not require a continuous flow of hot air. It is another object of the present invention to provide a method and apparatus for translating the stripper or portions thereof, the fiber or some combination thereof

SUMMARY OF THE INVENTION

The present invention provides a system and method for heat stripping an optical fiber (e.g., titanium dioxide color coded fiber). A short, heated burst of air is injected from a forced air heat source, and applied to one or more portions of the optical fiber. A short burst of air lasts less than about one second, and has a temperature of about 700–1100 degrees C. This is useful in quickly stripping a portion of the fiber cable (or spot stripping). The stripper may be a translatable stripper, whereby the stripper or portions thereof, the fiber(s), or some combination thereof, are translatable. In such a case, prolonged or multi-burst techniques may be used to strip one or more extended lengths of one or more fiber optic cables. In either case, due to the high temperature, the outer coating of the optical fiber is immediately removed, without degrading the original tensile strength of the fiber. No coating residue remains on the fiber, and no curling of the coating occurs. While heated air is used in a preferred embodiment of the invention, other embodiments may use other substances, such as other gases and fluids.

A system for stripping an optical fiber in accordance with the present invention includes an air source and means for generating short bursts or streams of air from the air source, by releasing compressed air during short periods of time. Typically, each short burst of air lasts less than one second. However, for stripping extended lengths of fiber the burst of air may have a longer duration, e.g., 4–5 seconds.

In one embodiment of the invention, the means for generating bursts of air includes an air pressure generator for creating air pressure, an air pressure controller for controlling air pressure, and an air flow regulator for regulating the flow of air out of the means for generating bursts of air, so as to controllably release compressed air from the means for generating bursts of air during very short time intervals. In one form of the invention, the air flow regulator may be a solenoid valve controlled by a timer.

The optical fiber stripping system further includes a heater for heating the bursts of air to a temperature sufficient to remove the outer coating from the optical fiber with a single burst. Typically, the requisite temperature is from about 700 degrees Celsius to about 1100 degrees Celsius. The heater heats the air bursts without bringing the air into contact with the heat source of the heater. In this way, the air avoids exposure to unwanted contaminating particles from the heat source, such as carbon or oxidized particles. The unwanted particles are thus prevented from being deposited on the fiber, and from reducing the tensile strength or performance characteristics of the fiber. The heater can be used to efficiently heat substances other than air, such as other gases and fluids.

The heater includes a heater core having a heat generating element. The heater core supplies heat to a heat chamber. An air conduit receives air from the means for generating bursts of air and is preferably configured to also receive heat from the heater core, thereby preheating the air. Along with a heat chamber outlet port, the air conduit and heat chamber form an isolated air transport path. When air is injected from the means for generating bursts of air into the air conduit, heat generated by the heat generating element in the heater core is transferred to the air while the burst of air flows through the conduit and through the heat chamber. In this way, the air stream is heated to a temperature sufficient to strip an optical fiber, while remaining isolated from the heat generating element in the heater core. An air output nozzle connected to the outlet port of the heat chamber directs the heated burst of air at the portion of the optical fiber to be stripped. The outer coating of the fiber is vaporized and removed almost instantly. In other forms, preheating in an air conduit may not be provided.

In various embodiments, the stripper or portions thereof are translatable with respect to the fiber. In other embodiments, the fiber may be translatable with respect to the stripper, or portions thereof. In such translatable strippers, multiple bursts of air may be used to strip an extended length of fiber, different areas on the same fiber, multiple fibers using the same output nozzle, or some combination thereof. Otherwise, several output nozzles may be provided, each configured for alignment with different fibers or different areas of the same fiber, and the heat chamber outlet port may be translatable (or include a translatable extension member) such that the outlet port couples to each of several output nozzles. Otherwise, multiple outlet ports and output nozzles may be provided, and one or more of those may be translatable.

The present invention features a method for stripping one or more optical fibers. The method includes delivering bursts, i.e., each burst of air characterized by a relatively short duration in time. The air bursts are injected into a heater via an isolated air transport path. The heater includes a heat chamber and a heat generating element. The bursts of air are heated within the heat chamber to a temperature sufficient to vaporize the outer coating from the fiber, without the air being exposed to the heat generating element. In one form, a single short burst of air of about 1 second or less is directed at a portion of the optical fiber to be stripped, so as to thermally remove the outer coating from the optical fiber within less than one second, i.e., spot stripping. In another form, continuous stripping is used to strip an extended portion of a fiber. Continuous stripping may be accomplished using a multi-burst technique where a series of closely spaced short bursts are applied to the extended portion of the fiber. In another form, continuous stripping is accomplished by a prolonged burst technique where a burst of about 4–5 seconds, as an example only, is applied along a length of fiber to be stripped. The actual duration of the prolonged burst is determined as a function of the length of the portion of the fiber to be stripped. Spot stripping or continuous stripping may be used with a single portion of a single fiber, different portions of the same fiber, or on different fibers. In various embodiments of the method, the output nozzle or stripper is translatable, the fiber or fibers are translatable, or some combination thereof.

BRIEF DESCRIPTION OF THE DRAWINGS

The drawing figures depict preferred embodiments by way of example, not by way of limitations. In the figures, like reference numerals refer to the same or similar elements.

FIG. 1 provides a schematic block diagram of a system for stripping an optical fiber, constructed in accordance with the present invention.

FIG. 5A provides a top view of a heater core, constructed in accordance with a preferred embodiment of the present invention.

FIG. 5B provides a side view of a heater core, constructed in accordance with a preferred embodiment of the present invention.

DETAILED DESCRIPTION OF THE PREFERRED EMBODIMENTS

Figure 2A:
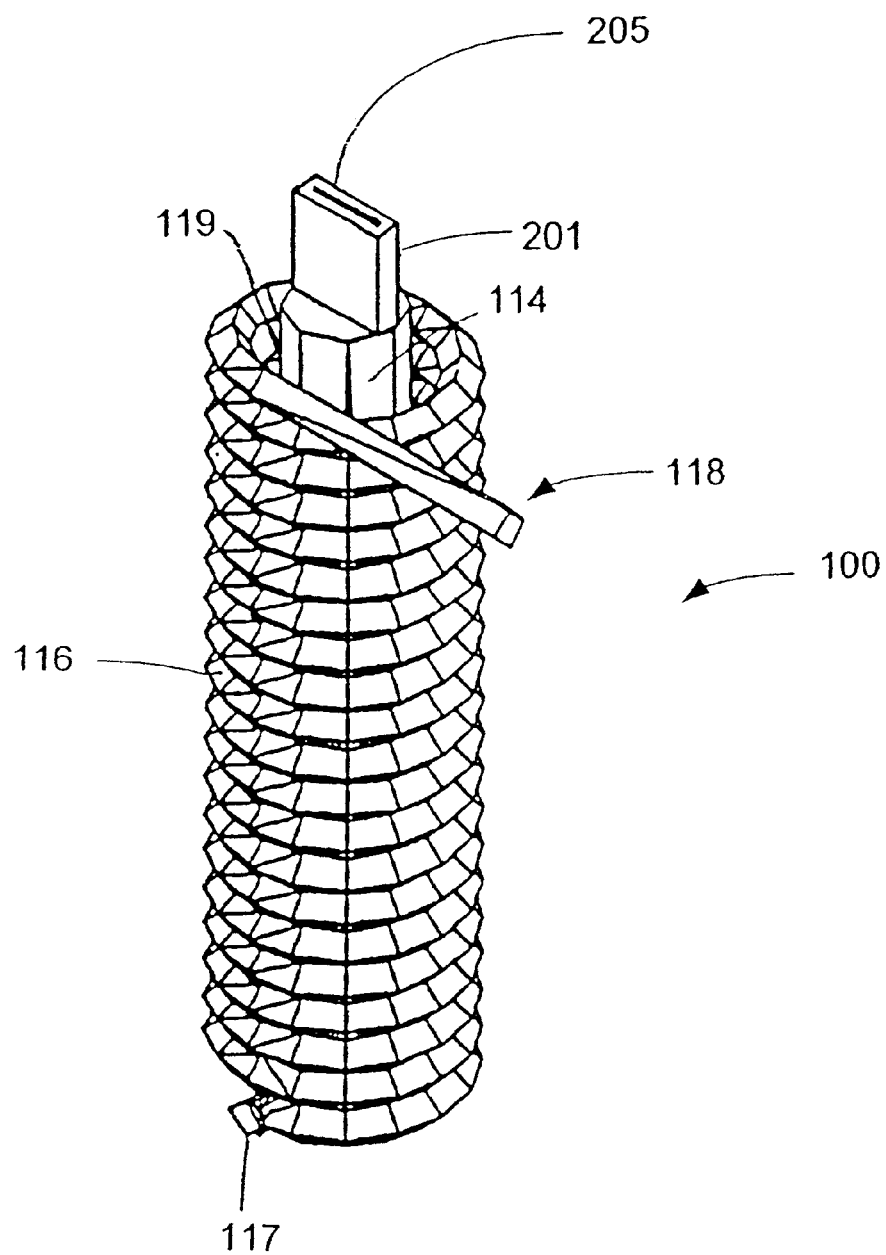
FIG. 2A provides an overall plan view of a heater and FIG. 2B provides a top view of an arrangement of heater exchange elements and air path, in accordance with the present invention.

The present invention provides a system and method for ultra-fast stripping of the outer coating from an optical fiber, without using chemicals and without reducing the original tensile strength of the fiber. The heating efficiency is significantly improved, as compared to the prior art.

FIG. 1 provides a schematic block diagram of a system 10 for stripping a fiber optic cable 50, constructed in accordance with one embodiment of the present invention. In overview, the system 10 includes a source of air 12, and means 14 for generating bursts of air, or air streams, from the air source. While air is used in the embodiment illustrated in FIG. 1, other substances can be used, including but not limited to gases and fluids. The system further includes a heater 16 for rapidly heating the bursts of air from the air source to a temperature sufficient to remove the outer coating from the fiber optic cable 50. The heater 16 can be used to heat substances other than air, such as other gases and fluids.

Preferably, the air source 12 supplies air through an air filter 34 to the means 14 for generating bursts of air. In this way, the means 14 for generating bursts of air receives air that is free of contaminants, such as oil or oxidized particles. A desiccant may also be added to the air, but the need or desire for use of the desiccant will often depend on the quality or purity of the air provided by air source 12.

In the embodiment of FIG. 1, the means 14 for generating bursts of air includes a pressure pump 22, a pressure vessel 20, a pressure switch 21, an air pressure controller 24, and an airflow regulator 26. Pressure pump 22 delivers filtered air to pressure vessel 20, thereby creating a pressure buildup in pressure vessel 20. The air pressure controller 24 controls the air pressure created by the pressure pump 22 within the vessel 20, and also controls the release of pressurized air pressure from pressure vessel 20. A pressure switch 21 can be used with the air pressure pump 22, in order to limit and maintain the pressure in the pressure vessel 20 under control of pressure controller 24.

The airflow regulator 26 is responsive to the air pressure controller 24, and regulates the flow of compressed air out of the pressure vessel 20, so as to release compressed air at desired times to create bursts of air. The airflow regulator 26 may include a solenoid valve 28, which can be used to release the air pressure from the pressure vessel 20 for very short time intervals, creating the burst effect. An adjustable timer 30 (e.g., a timer circuit), preferably including an embedded microprocessor, can be used to control the on/off switching of the solenoid valve, and thereby control the duration of the burst. A "Go" device or button 40 may be included to initiate the release of a burst of air, and may be in operative communication with the timer 30 or, in other embodiments, directly with the solenoid valve 28.

In manual operation, the "Go" device 40 can be a mechanical, electrical, or electromechanical button, switch or device. In an automated context, the "Go" device can be a controller, interface or port configured to receive a control signal. The burst of air released from the pressure vessel 20 is injected into an input port 118 of heater 16. A power supply 42 can be provided to supply power for the heater 16 and the timer 30, and an on/off switch 44 may regulate one or more of the heater 16, the pressure controller 24, and the pressure regulator 26 or the entire stripper system. A temperature controller 210 may be included to help regulate the heater 16 output, based on a temperature value feedback, as discussed in greater detail with respect to FIG. 3A below. The temperature controller 210 may also take power from power supply 42, as is shown in FIG. 1.

FIG. 2A provides an overall plan view of a heater 100, representative of heater 16 of FIG. 1, constructed in accordance with one embodiment of the present invention. In a preferred embodiment, the heater 100 is a process air heater that can achieve the extremely high air temperatures required to strip optical fiber, typically between about 700 degrees Celsius to about 1100 degrees Celsius. The heater 100 provides a unique combination of low cost, high efficiency, small size, purity, and maximum temperature. The heater 100 is designed so as to enclose most of the heat within an inner heat chamber 114, until heated air is released from an output nozzle 205 coupled to or integral with an outlet port 201 of the heat chamber 114. Preferably, the heater 100 has less than 10 minutes of ramp time, from room temperature to the desired temperature. The heater 100 is capable of achieving and maintaining air temperatures in excess of 1050 degrees Celsius, for long periods of time. The power requirement for the heater 100 is preferably a maximum of about 500 watts, at 120 volts AC. In the illustrated embodiment, the heater 100 is about 10 inches long and about 4 inches in diameter.

According to the present invention, effective stripping of an optical fiber requires that the process air heater 100 not introduce contamination of any kind to the air. If introduced into the air, the contaminating particles could deposit themselves onto the optical fiber, when the heated bursts of air from output nozzle 205 are applied to the stripping length of the optical fiber. This would eventually lead to degradation of the splice strength and performance of the fiber. Accordingly, the filtered air received by the means 14 for generating bursts of air remains isolated within an isolated air transport path until it is output by the stripper.

An isolated air transport path in accordance with the present invention is comprised of heat chamber 114, a means to couple to said means 14 of generating bursts of air to an input port 141 of said heat chamber 114, and the heat chamber outlet port 201. In the preferred form, an air conduit 116 couples, at an output end 117, to the heat chamber input port 141 (see FIG. 3A). The air conduit 116 includes the input port 118, into which air from the means 14 of generating bursts of air are injected, for example using an air injection nozzle at said input port 118. Upon injection of air into the air conduit 116, heat from the heater core 112 (see FIGS. 2B and 6) is transferred to the injected air while the air flows through the air conduit 116 and into the heat chamber 114. In this way, the air is pre-heated to aid in achieving the high temperatures necessary for stripping fiber optic cable, while avoiding any direct exposure to the heater core 112.

An air output nozzle 205, coupled to or integral with the outlet port 201, is used to direct heated bursts of air from the heat chamber 114 to the optical fiber to be stripped. In some embodiments, the air output nozzle 205 may be easily removable, facilitating the interchanging of nozzles, wherein different nozzles are provided having different output dimensions and characteristics, depending on the characteristics and dimensions of the object to be stripped.

In contrast to prior art methods, in which a continuous flow of exposed hot air is generated in order to strip an optical fiber, in the present invention the heat is enclosed in the chamber 114, until one or more well defined bursts of hot air is generated at approximately 700 to 1100 degrees C. The heated burst of air is directed at a portion of the fiber coating to be stripped. As previously mentioned, a short burst lasts less than about 1 second and a prolonged burst has a duration chosen based on the length of the portion of the fiber to be stripped, e.g., up to about 5 seconds. The entire polymer coating to be stripped is removed almost instantly, without curling. Also, there is very little or no ramp up time or flow of hot air between cycles or uses.

In the present invention, the heater 100 includes a heat exchanger. The heat exchanger enables the heater to heat the air to the desired high temperatures, while preventing exposure of the air to any unwanted particles from the heat generating element of the heater, such as oxidized metal particles or carbon. The heat exchanger is designed to maximize convection, conduction, and radiation. The use of a heat exchanger and isolated air path, together with the air filter 34 described in conjunction with FIG. 1, prevent oxidized or otherwise contaminated heater particles from coming into contact with the fiber. This is one of the reasons why the method and system of the present invention yield substantially higher and more consistent tensile strength of the stripped fiber, as compared to prior art methods.

In a preferred embodiment, the heat exchanger includes a heater core 112 (further illustrated in FIGS. 5A–B and FIG. 6) configured to generate heat and disposed to transfer heat to the heat chamber 114 and, preferably, air conduit 116. In one embodiment, the heater core 112 may be a replaceable component of the heater 100. By using a replaceable heater core, the cost and frequency of replacing a burned out heater can be minimized, and the heater can have a life-span of at least 5000+ hours. The heater core 112 preferably has a cylindrical shell structure and includes a heat generating element 113 (see FIG. 6). In a preferred embodiment, the heat generating element 113 is a conductive filament, such as a heater wire, that generates heat when an electrical potential is applied across the filament.

Figure 2B:
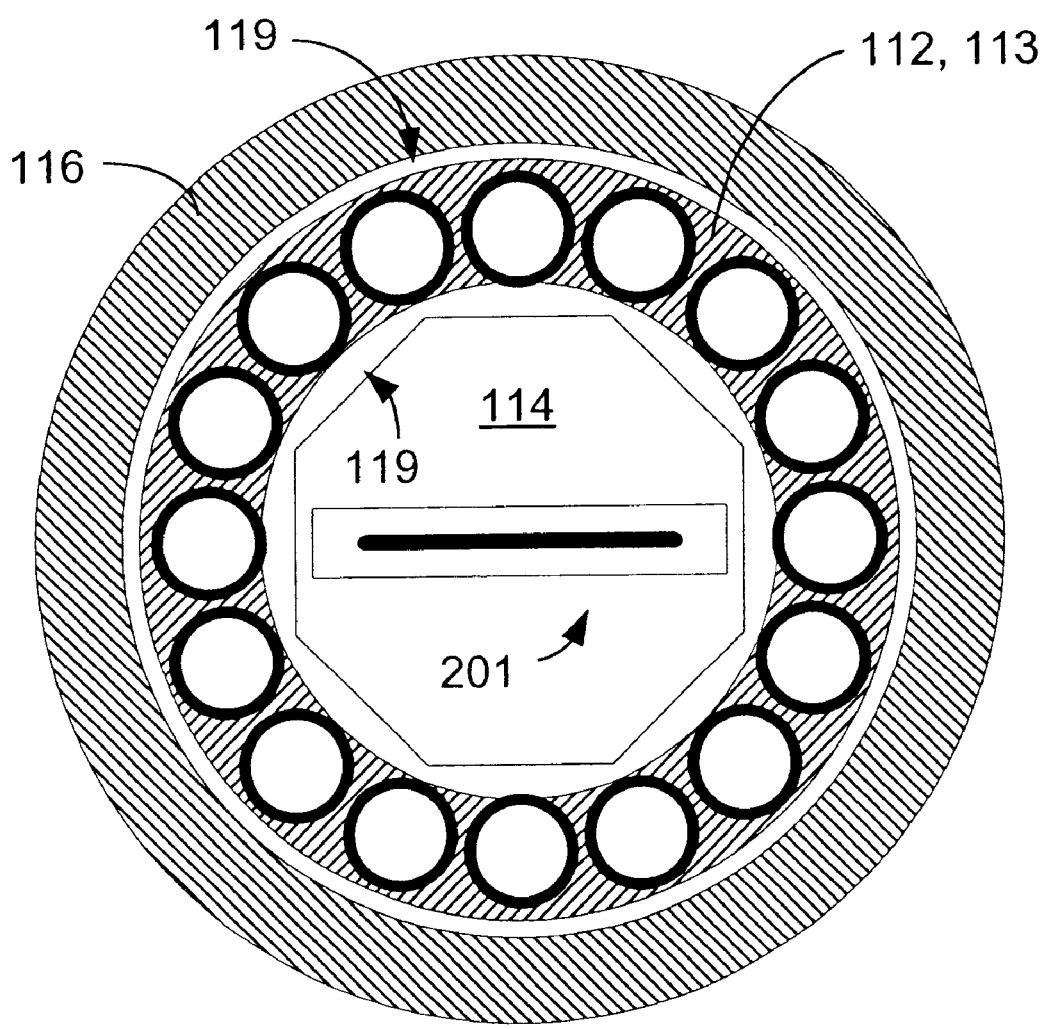

FIG. 2B provides a top view of the arrangement of the heat exchanger elements and the isolated air path, in accordance with the preferred embodiment. The air conduit 116 encircles the outer surface of the heater core 112 and the heater core 112 substantially encircles the heater chamber 114, having outlet port 201. Accordingly, a gap or void region 119 is formed between the inner heat chamber 114 and the outer spiral air conduit 116, to accommodate placement of the heater core 112 therebetween. Therefore, the gap region 119 is also substantially cylindrical, and is sized so as to allow the heater core 112 to be easily press-fit into the gap region 119. In a configuration in which a replaceable heater core 112 is used, the gap region 119 allows the replaceable heater core 112 (and heat generating element 113) to be easily inserted therein and removed therefrom.

The heat chamber 114 serves to enclose within the chamber most of the heat generated by the heat generating element 113 of the heater core 112, until a heated air burst is released from the chamber. When air conduit 116 is used, the air received by heat chamber 114 is preheated, so less heating within the heat chamber is needed, thus the heating process is relatively quick. If the air is not preheated, substantially all heating is accomplished in heat chamber 114. In either manner, the air within heat chamber 114 is fully heated to desired temperature for stripping and remains isolated from the heater core 112 and its heating element 113.

Figures 3A, 3B:
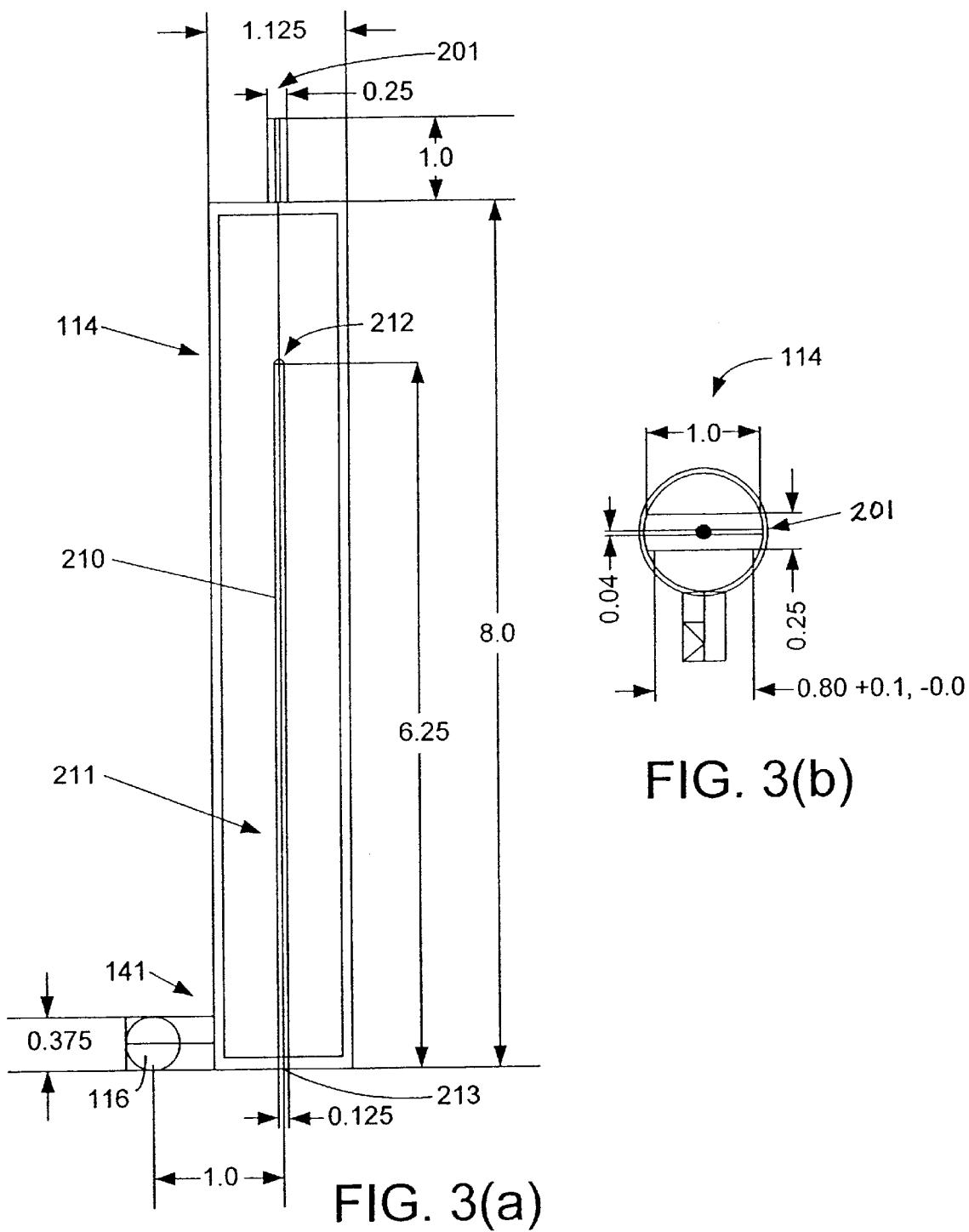
FIG. 3A provides a side view of the inner heat chamber.
FIG. 3B provides a top view of the inner heat chamber.

FIG. 3A provides a side view of one embodiment of the inner heat chamber 114.

In the illustrated embodiment, the heat chamber 114 has an outer diameter of about 1.125 inches, and a length of about 8.0 inches. The heat chamber 114 includes outlet port 201 for allowing the heated burst of air to exit from the heat chamber 114. Output nozzle 205 couples to outlet port 201 and directs the heated burst of air. The heat chamber inlet port 141 is preferably coupled to output end 117 of air conduit 116, preferably by welding. The heat chamber 114 causes the air flowing through the heater to slow down, compared to the rate at which the air flowed through the air conduit 116. This allows more heat to be absorbed into the process air.

In a preferred embodiment, the heat chamber 114 encloses the temperature controller 210 (also shown in FIG. 1), which provides measurement and feedback control of the temperature inside the heat chamber 114. Preferably, the temperature controller 210 is a thermocouple that is inserted into a small-diameter capillary tube 211. The small diameter tube 211 is closed at a first end 212, and is open at a second end 213 in order to allow for insertion of the thermocouple. The thermocouple 210 allows accurate measurement of the process air temperature, without adding contamination during the measurement process, since capillary tube 211 prevents exposure of the air in heat chamber 114 to the thermocouple 210.

FIG. 3B illustrates the dimensions of the heat chamber 114, as from a top view. In the illustrated embodiment, the inner diameter of the heat chamber 114 is about 1.0". The hot air outlet port 201 is shown as having a diameter of about 0.25".

Figure 4A:
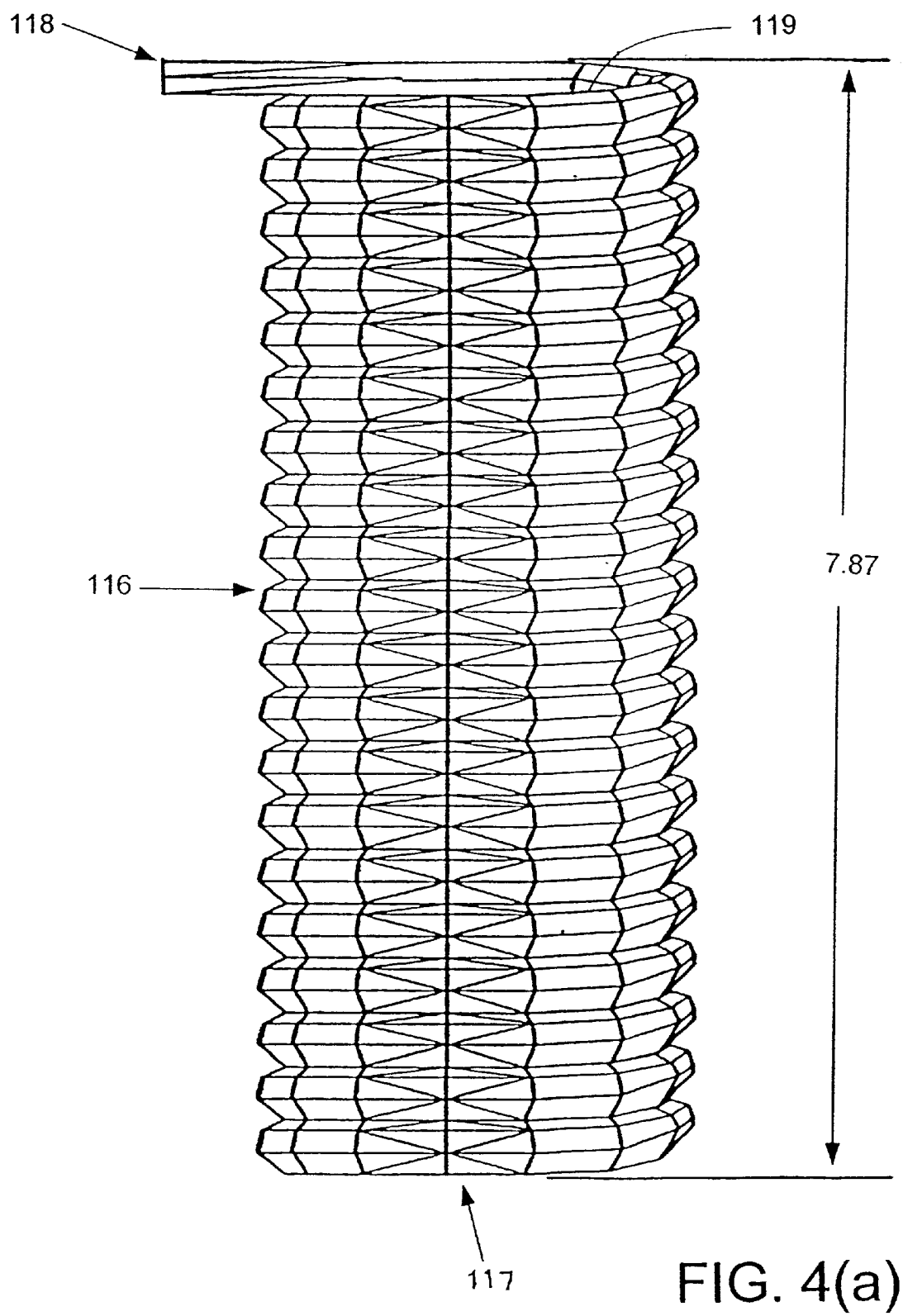
FIG. 4A provides a side view of the spiral-shaped air conduit that surrounds the heater core.

FIG. 4A provides a side view of one embodiment of the spiral-shaped air conduit 116 that surrounds the heater core 112. In this view, the heater core 112 and heat chamber 114 are not present. The spiral shaped air conduit 116 is preferably made of quartz and forms a helical coil defining a plurality of turns. The outer surface of the heat chamber 114 and the inner surface of the helical coil define the gap region 119, which is shaped as a tube-shell so as to allow the heater core 112 to be press fit into the gap region 119, as is shown in FIG. 2B. As previously noted, the spiral-shaped conduit 116 includes an input end 118 and an output end 117. The input end 118 is configured to receive air from an air input nozzle of the means 14 for generating bursts of air, which serves to inject air from the air source 12 (shown in FIG. 1) into the air conduit 116. As described earlier, the output end 117 of conduit 116 is welded to the heat chamber inlet port 141 of heat chamber 114, allowing air from the air conduit 116 to enter the heat chamber 114. The heated air stream exits the chamber 114 from the air outlet port 201.

Figure 4B:
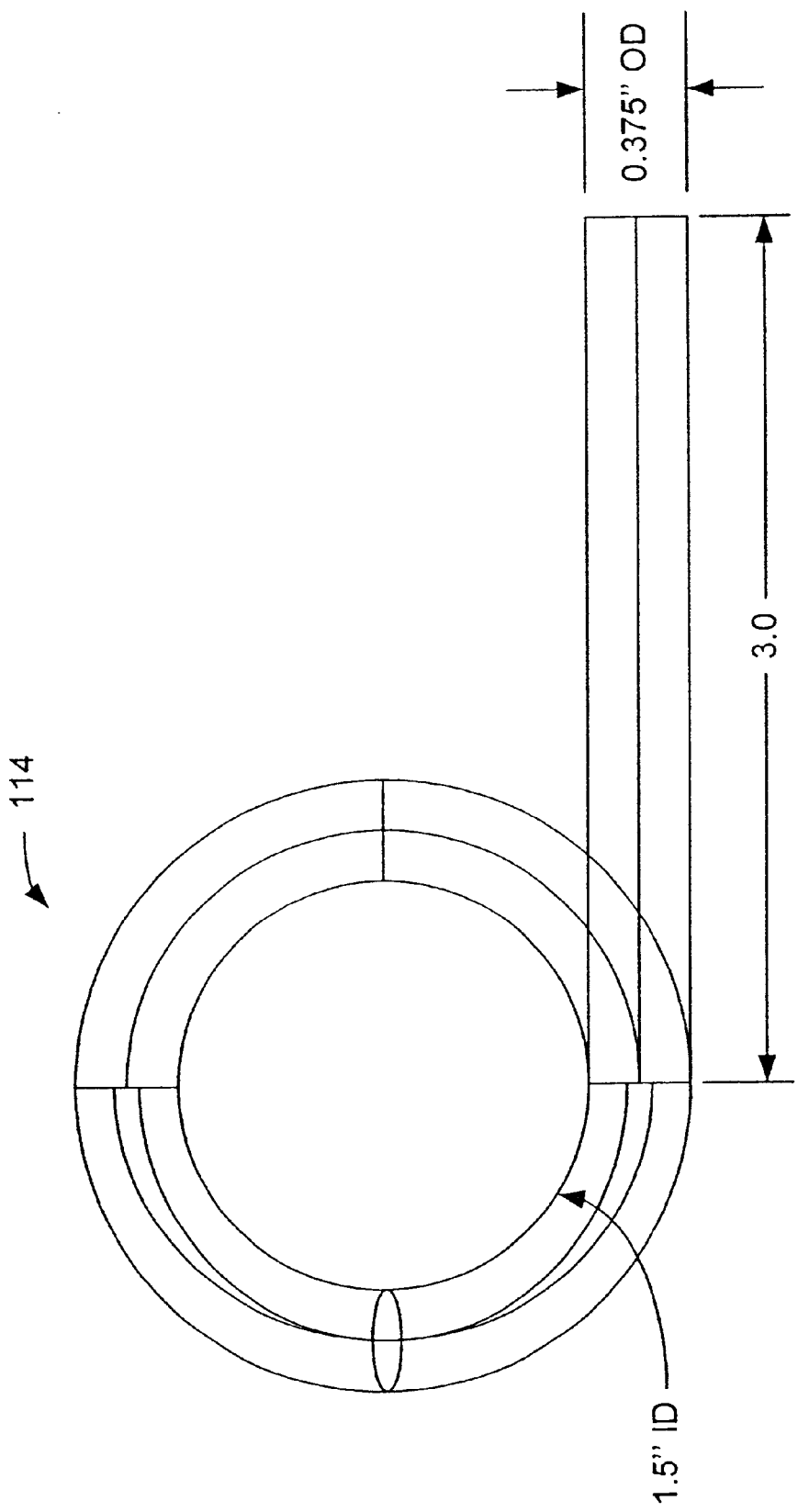
FIG. 4B provides a top view of the spiral-shaped conduit.

FIG. 4B illustrates the dimensions of the air conduit 116, as viewed from the top. In the illustrated embodiment, the outer spiral conduit 116 has an inner diameter of 1.5 inches. The difference between the inner diameter and the outer diameter of the spiral conduit 116 is about 0.375 inches, as shown. As described in reference to FIG. 3B, the inner heat chamber 114 has an outer diameter of 1.125 inches. The thickness of the shell-shaped gap region 119 formed between the inner chamber and the outer spiral is thus given by:

(1.5−1.125)/2=0.1875 inches.

FIGS. 5A and 5B illustrate heater core 112, constructed in accordance with a preferred embodiment of the present invention. FIG. 5A provides a top view (not shown to scale) of the heater core 112, whereas FIG. 5B provides a side view (both views not shown to scale). In the illustrated preferred embodiment, the heater core 112 has a cylindrical, tubular configuration, and is made of quartz. The heater core 112 preferably has a wall thickness of about ⅛ inches, and an overall length of about 7 inches.

The inner and outer diameters of the heater core 112 are sized so as to fit into the gap region 119 described above. As described with reference to FIG. 4B, the size of the gap region 119 between the chamber 114 and the conduit 116 is (1.5−1.125)/2=0.1875 inches=4.7625 mm. The total space which needs to be shared by the outer diameter and the inner diameter of the heater core 112 is therefore given by the difference between the size of the gap 119 and the maximum diameter of the quartz tube 300:

4.7625 mm−3 mm=1.7625 mm=0.035 inches.

The maximum outer diameter (ODmax) of the heater core 112 is given by the difference between the inner diameter of the spiral conduit 116 and about one half of the space shared by the outer and inner diameter of the heater core 112, i.e.,:

ODmax (heater core)=1.5 in−0.035 in=1.465 inches.

The minimum inner diameter (IDmin) of the heater core 112 is given by the sum of the outer diameter of the inner chamber 114 and about one half of the space shared by the outer and inner diameters of the heater core:

IDmin (heater core)=1.125 inner chamber OD+0.035 in=1.16 inches.

The cylindrical heater core 112 has a first end 310 and a second end 311. A set of evenly spaced notches 320 are cut out at both ends 310 and 311 of the heater core 112. In the illustrated embodiment, each notch 320 is about 2 mm wide, and 4 mm deep. The heat generating element 113 is a conductive wire wound inner diameter to outer diameter. The notches 320 are used to evenly space the wire 113.

Figure 6:
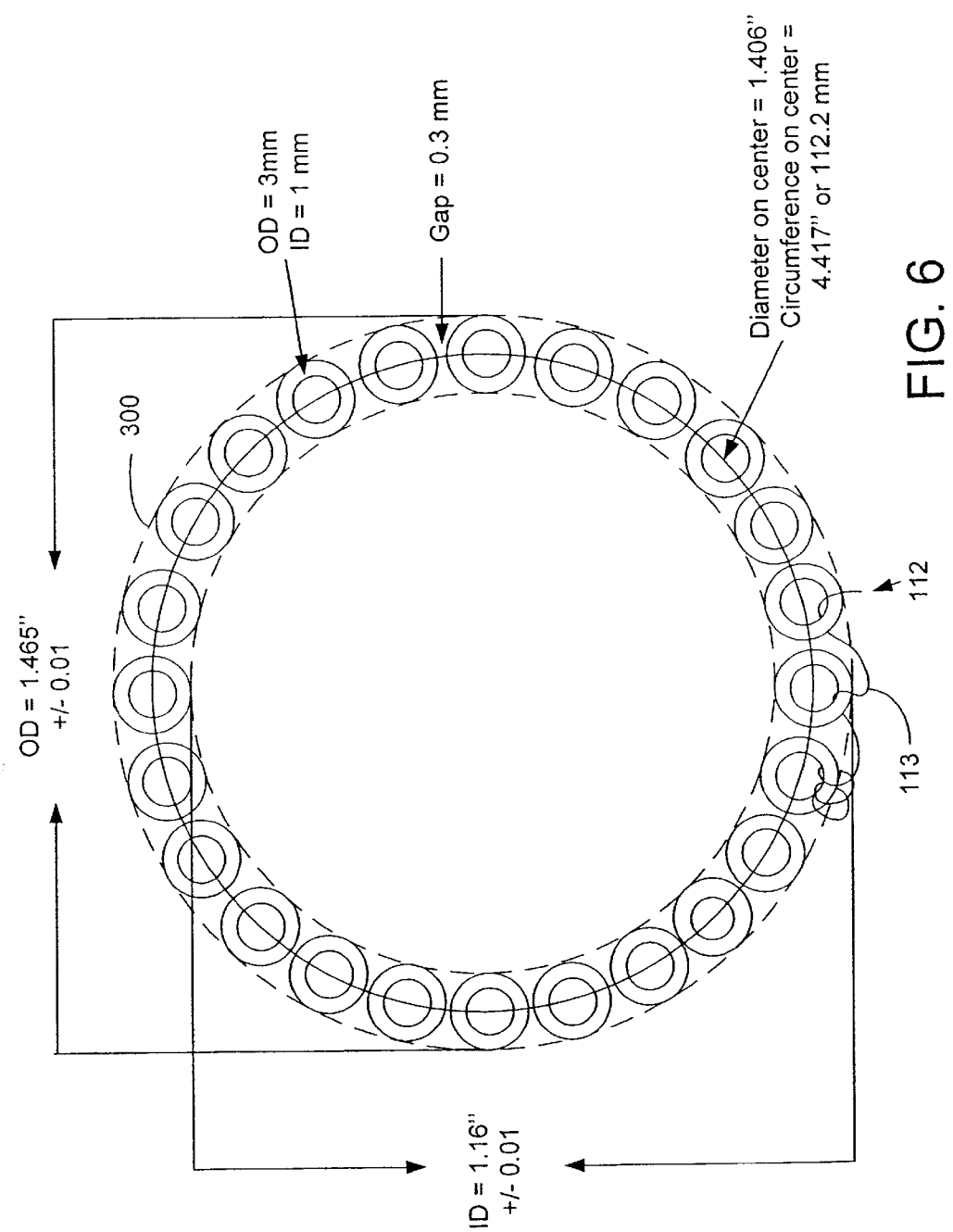
FIG. 6 provides a cross-sectional view of a heater core, constructed in accordance with another embodiment of the present invention.

FIG. 6 shows a top view of an embodiment of heater core 112, which includes heat generating element 113. In a preferred embodiment, the heat generating element 113 may be a conductive filament, such as a heater wire, which generates heat upon application of an electrical potential across the filament, although other embodiments of the invention may use other types of heat generating elements. The heater core 112 preferably operates at a maximum of 500 watts, at 120 Volts. The current through the heat generating element 113 is therefore 500/120=4.17 Amps. The heater wire 113 should therefore has a resistance of about 120/4.17 =28.8 Ohms. In the illustrated embodiment, a 22 gauge Kanthal A1 heater wire, having a length of about 21.5 feet and a diameter of 0.644, is used, although other embodiments of the invention may use other types of heater wires, such as Kanthal APM heater wire. The Kanthal A1 22 gauge wire has a resistance of 1.36 Ohms per foot.

The 22 gauge Kanthal A1 heater wire 113 encircling the heater core 112 defines conductive coils that surround the cylindrical shell structure. About 21 feet of heater wire 113 is used. The cylindrical heater core is preferably press fit into the gap 119 between the inner chamber 114 and the outer spiral conduit 116. Both ends of the heater wire 113 extend out to the back end of the heater 100. An outer case (not shown) may be provided for the heater 100, preferably made of steel and having an outer diameter of about 4 inches, and a length of about 9 inches. The heater wire 113 terminates at ceramic terminals that electrically isolate them from the outer case.

The conductive coils that surround the heater core 112 radiate heat energy, when a voltage is applied across the coils. The heat energy is radiated both radially inward, toward the heat chamber 114, and radially outward, toward the outer spiral conduit 116 (see FIG. 2B). In particular, the conductive coils define a heat flow path for the heat energy in a first direction radially inward of the coils toward the heat chamber 114, and in a second direction radially outward of the coils toward the spiral-shaped conduit 116, substantially opposite the first direction. Because heat is radiated in both directions, heating takes place both in the heat chamber 114 and in the conduit 116, increasing the efficiency of the heating process.

Preferably, the heater core 112 does not have glass to glass contact, either with the inner heat chamber 114 or with the outer spiral conduit 116, both of which are preferably made of quartz. It is thus desirable that there be an inner and outer spacing around the heater core 112, see FIG. 2B. For this purpose, high temperature buffer material, for example ceramic tape, may be placed at the top and bottom inner diameter and outer diameter of the heater core 112, to provide insulation. The ceramic tape can be placed over the weld points, at the top and bottom on the inner diameter and the outer diameter of the heater core 112. The tape may also be wrapped around the outer diameter of the heater core 112, and around the ends of the outer spiral conduit 116.

In this embodiment of FIG. 6, the body of the heater core 112 is formed by welding together a plurality of quartz tubes 300, disposed side by side and spaced apart from each other in an annulus so as to form a cylindrical shell structure. In the illustrated exemplary embodiment of the invention, 34 quartz tubes, each having a length of about 7.5 inches, are welded together, 1 inch from both ends, to form a cylindrical shell structure. The tubes are spaced apart by about 0.3 mm, on average.

In the illustrated embodiment, the outer diameter of the quartz tubes 300 that are used to form the body of the heater core come in increments of 1 mm, i.e. the outer diameters of the tubes range may be 1 mm, 2 mm, 3 mm, or larger. Since there must be room for the buffer material on the inner diameter and the outer diameter of the heater core, however, the diameter of the quartz tube is preferably not larger than 3 mm. Since 34 tubes are used in the illustrated embodiment, each having a diameter of 3 mm, and with a 0.3 mm gap between each tube, the circumference of the cylindrical heater core 112, as measured along the center of the constituent quartz tubes, is about 112.2 mm.

In operation, the solenoid valve (shown in FIG. 1) is activated to generate a short burst of air, by releasing air pressure from the pressure vessel. The heater is activated by applying an electric potential through the heater wire 113, so that heat is generated by the wire. The burst of air is injected, using an air injection nozzle, into an input end of the outer spiral conduit 116 surrounding the heater core 112. The burst of air is rapidly heated as the air flows through the spiral conduit 116, and enters the heat chamber 114 which encloses the heat generated by the heater wire 113. The burst of air flows through the heat chamber 114, and exits from an outlet port of the heat chamber 114. An air output nozzle connected to the outlet port of the heat chamber 114 directs the heated burst of air at the outer coating of an optical fiber. The air output nozzle is preferably relatively wide, so that heated air can be directed to the entire stripping length of the fiber. The entire polymer coating on the outside of an optical fiber is vaporized and removed almost instantly.

In various embodiments the stripper or portions thereof are translatable with respect to the fiber. In other embodiments, the fiber may be translatable with respect to the stripper, or portions thereof. In such translatable strippers, multiple bursts of air may be used to strip an extended length of fiber, different areas on the same fiber, multiple fibers using the same output nozzle, or some combination thereof. Otherwise, several output nozzles may be provided, each aligned with different fibers or different areas of the same fiber, and the heat chamber 114 outlet port 201 may be translatable (or include a translatable extension member) such that the outlet port couples to each of several output nozzles. Otherwise, multiple outlet ports and nozzle may be provided, and one or more of those may be translatable.

Figure 7A:
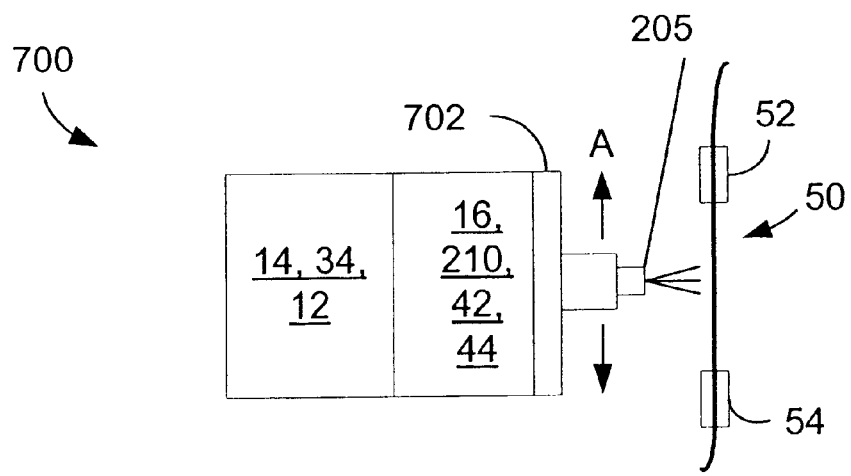
FIGS. 7A–7H show various embodiments of translatable strippers, in accordance with the present invention.

In FIG. 7A, a top view of a translatable stripper 700 is shown. In this embodiment, the air source 12, filter 34, and means 14 for generating bursts of air are collectively represented in a single block, for simplicity. Similarly, the heater 16, temperature controller 210, power supply 42, and on/off switch 44 are represented by a single block. In this embodiment fiber optic cable 50 is supported by two cable supports 52, 54. Output nozzle 205 is translatable with respect to the fiber 50 (e.g., a titanium dioxide color coded fiber), as indicated the arrows marked "A". To achieve such translation, the output nozzle 205 is coupled to an electro-mechanical controller 702 that is preferably preprogrammed for translation and stripping.

For instance, the electro-mechanical controller 702 may be pre-programmed to move the output nozzle along the length of fiber 50 for continuous stripping of an extended portion of fiber 50 using a series of closely spaced bursts (i.e., mulit-burst) of heated air or a prolonged burst (e.g., a burst of about 4–5 seconds) of heated air, or for spot stripping of predefined portions of fiber 50 with individual or short bursts (i.e., about 1 second or less) of heated air. Continuous (i.e., either multi-burst or prolonged burst) can also be used on several portions of fiber 50.

Figure 7B:
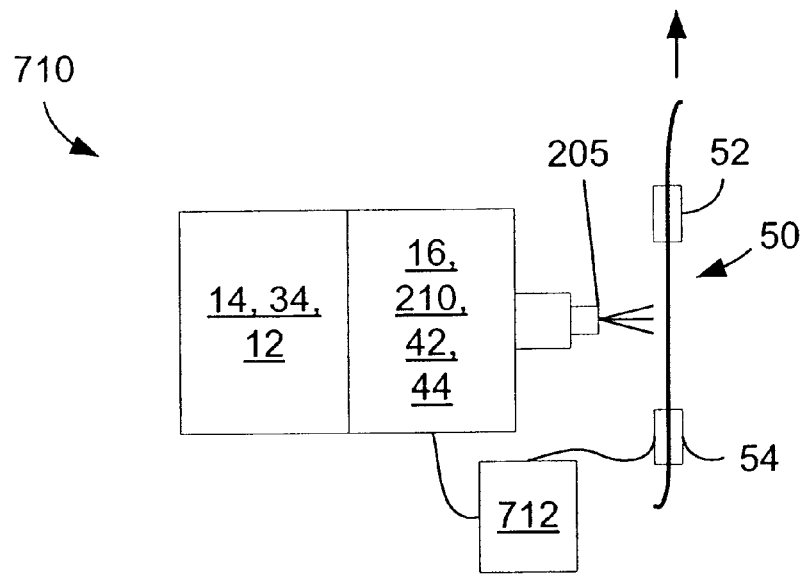

In FIG. 7B a top view of another embodiment of a translatable stripper 710 is shown. In this embodiment, the output nozzle 205 is stationary, but the fiber 50 is translatable, under the control of a fiber controller 712. The fiber 50 may be translated in one of at least two manners. First, fiber 50 may be secured in place by cable supports 52, 54, and cable supports 52, 54 may move in the direction of arrow A. Second, support 52 may act as a guide and support 54 may include a spool of fiber optic cable 50. The spool support 54 may be configured to pull (or push) the fiber 50 in the direction of arrow A, which causes it to translate across an opening of output nozzle 205. Bursts of air are selectively (e.g., with preprogramming and in concert with spool support 54) directed from output nozzle 205 to strip fiber 50. Fiber 50 may be stripped along an extended length using the multi-burst or prolonged burst techniques, or fiber 50 may be spot stripped at different places on the fiber 50 using short burst, multi-burst, or prolonged burst techniques.

Figure 7C:
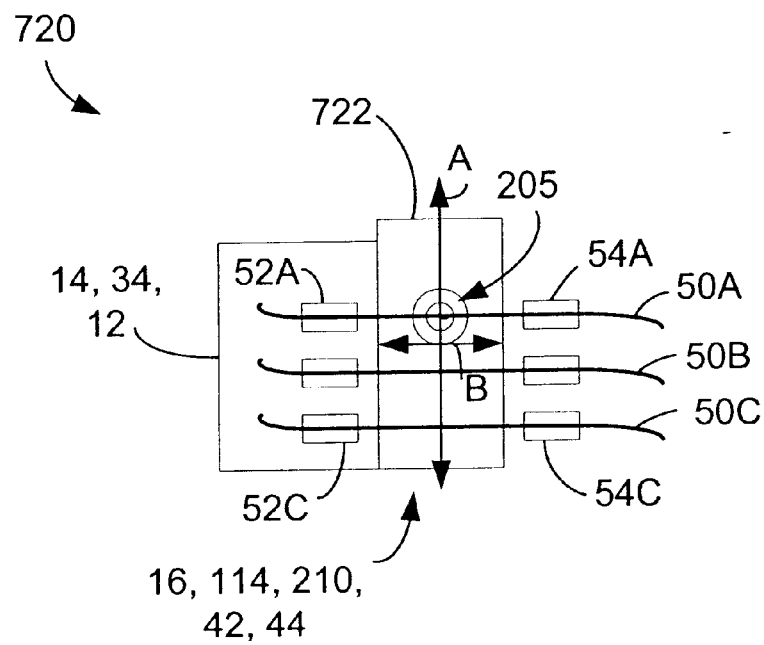

In FIG. 7C is a front view of another embodiment of a translatable stripper 720 is shown. In this embodiment, several fibers 50A, 50B, and 50C are loaded into fiber supports 52A & 54A, 52B & 54B and 52C & 54C to be stripped by a single translatable output nozzle 205. The output nozzle 205 may be translated in the direction of arrow A or arrow B, under the control of controller 722. Stripper 720 may be programmed for any combination of continuous stripping or spot stripping of any of the fibers 50A, 50B, and 50C. In FIG. 7C, three fibers are shown for illustration, but there is no inherent limit on the number of fibers that may be stripped. As with the embodiments above, fibers 50A, 50B, and 50C may be stripped along an extended length using the multi-burst or prolonged burst techniques, or fibers 50A, 50B, and 50C may be spot stripped at different places on the fiber 50 using short bursts, multi-burst, or prolonged burst techniques.

Figure 7D:
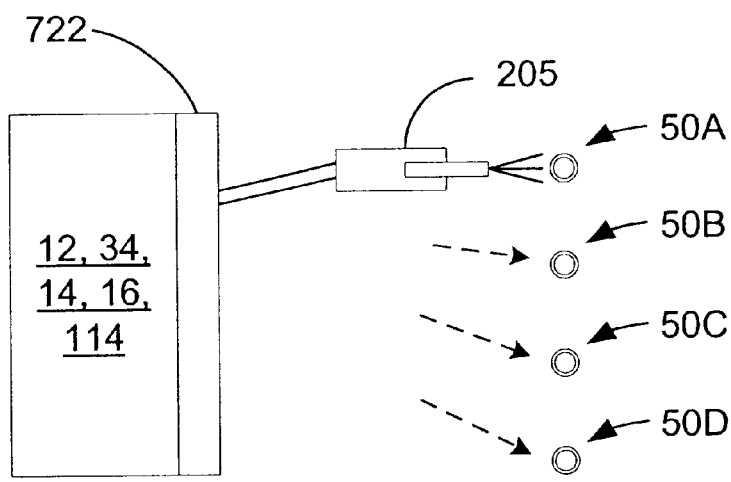

FIG. 7D shows a side or top view of the translatable stripper of FIG. 7C, but with four fibers 50A, B, C, D being stripped by a single output nozzle 205. Cable supports are omitted in FIG. 7D.

Figure 7E:
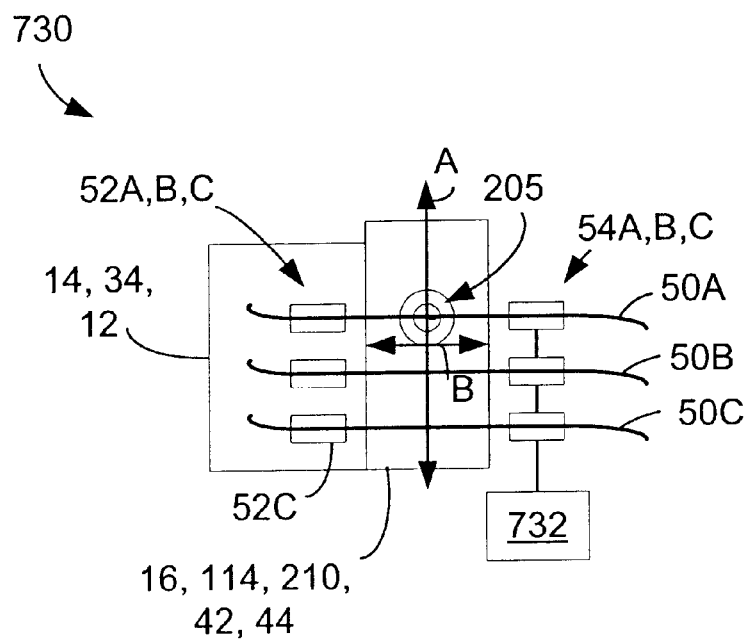

In FIG. 7E is a front view of another embodiment of a translatable stripper 730 is shown. In this embodiment, the output nozzle remains stationary and fibers 50A, 50B, and 50C are translatable in the direction of arrow A and/or arrow B. The fibers are supported or secured by cable supports 52A & 54A, 52B & 54B and 52C & 54C, which move under the guidance of controller 732. Otherwise, supports 52A, B, C can serve as guides and supports 54A, B, C can be spool supports, as previously discussed. Once again, continuous stripping and spot stripping are preferably both be accommodated. Fibers 50A, 50B, and 50C may be stripped along an extended length using the multi-burst or prolonged burst techniques, or fibers 50A, 50B, and 50C may be spot stripped at different places on the fiber 50A, 50B, and 50C using short bursts, multi-burst, or prolonged burst techniques.

Figure 7F:
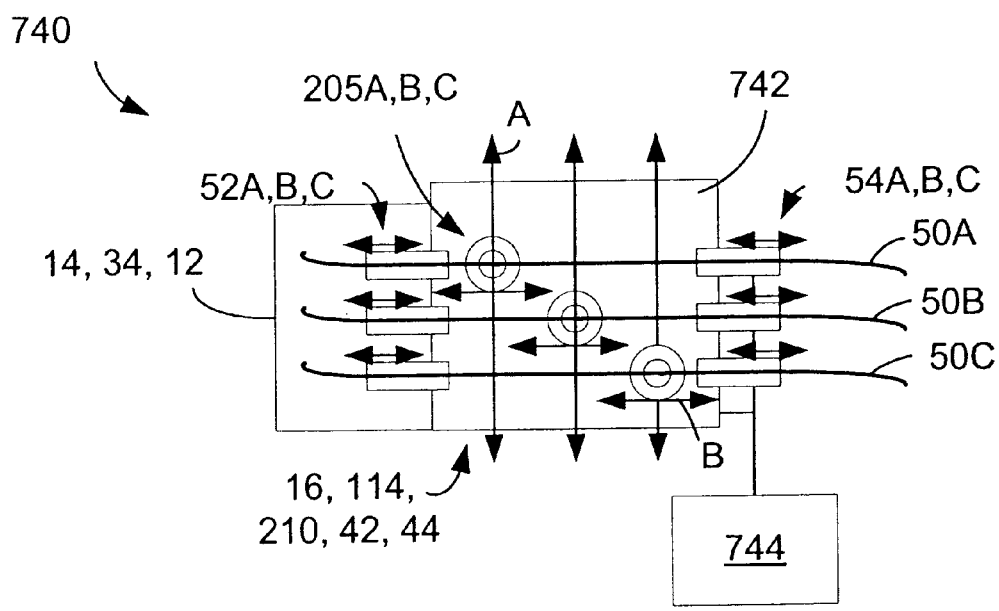

In FIG. 7F is a front view of another embodiment of a translatable stripper 740 is shown. In this embodiment, the fibers 50A, B, C and the output nozzles 205A, B, C are translatable in the direction of arrow A and/or arrow B. The fibers 50A, B, C move under the guidance of controller 742 (as previously discussed) and the output nozzles 205A,B,C move under the guidance of controller 744. Output nozzles 205A, B, C may take different forms, yielding different output patterns or characteristics. Once again, continuous stripping and spot stripping are preferably both be accommodated. Fibers 50A, 50B, and 50C may be stripped along an extended length using the multi-burst or prolonged burst techniques, or fibers 50A, 50B, and 50C may be spot stripped at different places on the fiber 50A, 50B, and 50C using short bursts, multi-burst, or prolonged burst techniques.

Figure 7G:
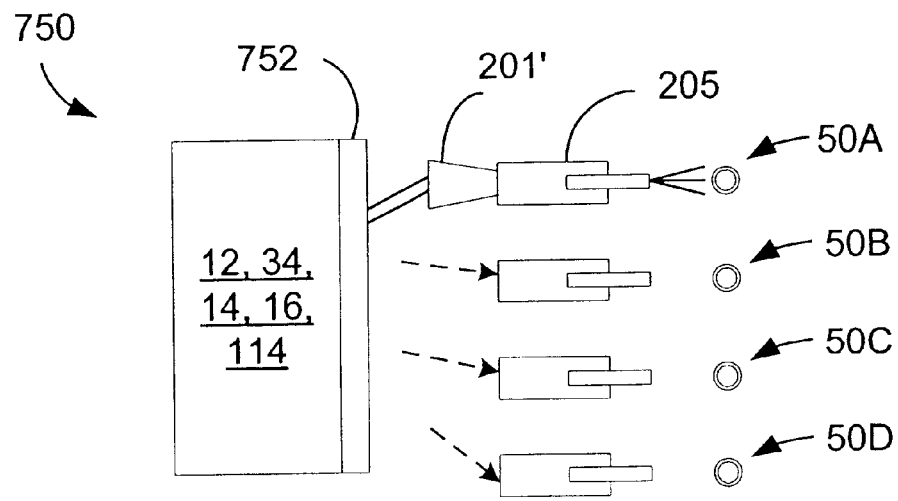

FIG. 7G can be a top or side view of another embodiment of a translatable stripper 750. In this embodiment, several different output nozzles 205A, B, C, D may be used, each associated with a different fiber optic cable 50A, B, C, D. A single outlet port 201' is provided, configured to selectively couple to each of the output nozzles 205A, B, C, D, shown by dashed ray lines. Outlet port 201' operates under the guidance of a controller 752, which is preferably preprogrammed to accomplish desired continuous and spot stripping of fibers 50A, B, C, D. That is, fibers 50A, 50B, 50C and 50D may be stripped along an extended length using the multi-burst or prolonged burst techniques, or fibers 50A, 50B, 50C and 50D may be spot stripped at different places on the fiber 50A, 50B, 50C and 50D using short bursts, multi-burst, burst, or prolonged burst techniques.

Figure 7H:
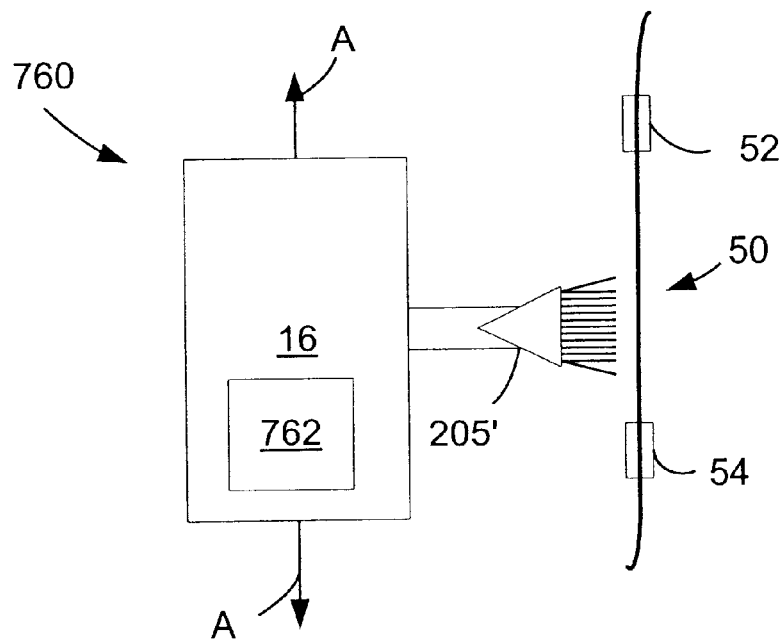

In FIG. 7H, for example, a top or side view of another embodiment of a translatable stripper 760 is shown. A controller 762 moves the heater 16 and output nozzle 205' in the direction of arrow A, although movement in other directions can also be accommodated. In this embodiment, a wider output nozzle 205' is used, rather than the nozzle 205, to create a wider spray for the burst. A prolonged burst may be used as the heater 16 and output nozzle 205' move along the length of the fiber 50. As with other embodiments, the configuration of FIG. 7H may also be adapted to strip several loaded fibers (e.g., fibers 50A, B, C, and D). Also, as with other embodiments, the multi-burst or short bursts may be used. Also, the output nozzle 205 of other embodiments could also be used with translatable stripper 760, as could output nozzles of other configurations.

In any of the above embodiments of FIGS. 7A–7H, the outlet port 201/201' may an include an extension member configured to couple between the outlet port and the output nozzle 205/205'. In other embodiments, the entire heater 16 is translatable, such that outlet port 201/201' and outlet 205/205' need not be translatable.

In summary, the method and system of the present invention allows rapid and efficient stripping of optical fibers, without using chemicals. The virgin strength of the fiber is not degraded, since no mechanical scratching of the fiber occurs, and the fiber is not exposed to any oxidized metal particles, carbon, or other contamination from the heat source. The method and system of the present invention can be used on titanium dioxide color coded fiber without degrading the splice strength. Virtually no coating residue is left on the fiber, and no curling of the polymer coating is caused, so that no interference is caused with the next step in optical fiber processing, such as splicing. No rinse step is therefore required, after the fiber has been stripped. Stripping may include translation of the fiber or the heater or portions thereof. The stripper may be configured to strip several loaded fibers.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. It is intended by the following claims to claim any and all modifications and variations that fall within the true scope of the inventive concepts.

What is claimed is:

1. A system for stripping at least one optical fiber having an outer coating, the system including:
    a) an air source;
    b) means, in operative communication with said air source, for generating one or more air streams from said air source during a predetermined time interval;
    c) a heater for heating said one or more air streams to a predetermined temperature to remove the outer coating from the at least one optical fiber, the heater including:
        i) an isolated air stream transport path for receiving an air stream from said air source, said air stream transport path comprising a beat chamber and a first end coupled to said air source and at least one outlet port;
        ii) a heater core having a heat generating element, said heat chamber disposed within said heater core and said heater core configured to allow heat from said heat generating element to be transferred to said air stream within said air stream transport path, wherein said air stream is substantially heated to said predetermined temperature and remains isolated from said heater core;
        iii) at least one output nozzle coupled to said at least one outlet port and configured to direct said heated air stream onto said at least one optical fiber to remove the outer coating from said at least one optical fiber; and
    d) a translator in communication with and configured to selectively translate at least one of said at least one output nozzle and said at least one optical fiber, to direct said heated air stream from said at least one output nozzle onto a portion of said at least one optical fiber to be stripped.

2. A system according to claim 1, wherein said predetermined temperature is from about 700 degrees C to about 1100 degrees C.

3. A system according to claim 1, wherein said predetermined time interval is a short burst of said air stream of less than about 1 second.

4. A system according to claim 1, wherein said portion of said at least one optical fiber to be stripped is an extended portion of said at least one optical fiber and said predetermined time interval is a prolonged burst of said air stream of up to about 5 seconds, wherein said at least one output nozzle is translated along said extended portion of said at least one optical fiber during said predetermined time interval.

5. A system according to claim 1, wherein said portion of said at least one optical fiber to be stripped is an extended portion of said at least one optical fiber and said means for generating one or more air streams generates a plurality of air stream bursts, wherein said at least one output nozzle is translated along said extended portion of said at least one optical fiber.

6. A system according to claim 1, wherein said at least one optical fiber is a plurality of optical fibers and said translator is configured to selectively position said at least one output nozzle at each of said plurality of optical fibers.

7. A system according to claim 1, wherein said translator is configured to position said at least one output nozzle at a plurality of portions on a single optical fiber to be stripped.

8. A system according to claim 1, wherein said translator is configured to position said at least one output nozzle at a plurality of portions on said at least one optical fiber.

9. A system according to claim 1, wherein said translator is configured to translate a plurality of optical fibers and a plurality of output nozzles.

10. A system according to claim 1 wherein said at least one optical fiber is a plurality of optical fibers.

11. A system for stripping at least one optical fiber having an outer coating, the system including:
    a) an air source;
    b) means, in operative communication with said air source, for generating one or more air streams from said air source during a predetermined time interval;
    c) a heater for heating said one or more air streams to a predetermined temperature to remove the outer coating from the at least one optical fiber, the heater including:
        i) an isolated air stream transport path for receiving an air stream from said air source, said air stream transport path comprising a heat chamber and a first end coupled to said air source and at least one outlet port;
        ii) a heater core having a heat generating element, said heat chamber disposed within said heater core and said heater core configured to allow heat from said heat generating element to be transferred to said air stream within said air stream transport path, wherein said air stream is substantially heated to said predetermined temperature and remains isolated from said heater core;
        iii) at least one output nozzle coupled to said at least one outlet port and configured to direct said heated air stream onto said at least one optical fiber to remove the outer coating from said at least one optical fiber; and
    d) a translator in communication with said heater and configured to translate said heater.

12. A method for stripping at least one optical fiber having an outer coating, the method comprising:
    A. generating air stream bursts from an air source;
    B. providing a heater comprising:
        i) an isolated air stream transport path comprising a heat chamber and having a first end coupled to said air source and at least one outlet port; and
        ii) a heater core having a heat generating element, said heat chamber being disposed within said heater core;

C. heating said heat chamber by generating heat from said heat generating element of said heater core;

D. transporting one or more of said air stream bursts from said air source to said heat chamber;

E. heating one or more of said air stream bursts within said heat chamber to a predetermined temperature to remove said outer coating from said at least one optical fiber, while isolating said one or more air stream bursts from said heater core;

F. providing at least one output nozzle for coupling to said heat chamber;

G. directing one or more of said air stream bursts from said heat chamber to said at least one output nozzle;

H. translating one or more of said at least one output nozzle and said at least one optical fiber, and aligning said at least one output nozzle with a portion of said at least one optical fiber to be stripped; and I. directing one or more of said air stream bursts from said output nozzle onto said at least one optical fiber, so as to thermally remove the outer coating from said at least one optical fiber.

13. A method according to claim 12, wherein said predetermined temperature is between about 700 degrees to about 1100 degrees.

14. A method according to claim 12, wherein one or more of said air stream bursts have a short duration of less than about 1 second.

15. A method according to claim 12, wherein said portion of said at least one optical fiber to be stripped is an extended portion and one or more of said air stream bursts have a prolonged duration of up to about 5 seconds.

16. A method according to claim 12, wherein said portion of said at least one optical fiber to be stripped is an extended portion of said optical fiber and one or more of said air stream bursts is comprised of a series of bursts each having a duration of less than about 1 second..

17. A method according to claim 12, wherein step H includes translating a plurality of output nozzles or a plurality of optical fibers.

18. A method for stripping at least one optical fiber having an outer coating, the method comprising:

A. generating air stream bursts from an air source;

B. providing a heater comprising:
   i) an isolated air stream transport path comprising a heat chamber and having a first end coupled to said air source and at least one outlet port; and
   ii) a heater core having a heat generating element, said heat chamber being disposed within said heater core;

C. heating said heat chamber by generating heat from said heat generating element of said heater core;

D. transporting one or more of said air stream bursts from said air source to said heat chamber;

E. heating one or more of said air stream bursts within said heat chamber to a predetermined temperature to remove said outer coating from said at least one optical fiber, while isolating said one or more air stream bursts from said heater core;

F. providing at least one output nozzle for coupling to said heat chamber;

G. directing one or more of said air stream bursts from said heat chamber to said at least one output nozzle; and H. translating said heater to direct one or more of said air stream bursts from said output nozzle onto said at least one optical fiber, so as to thermally remove the outer coating from said at least one optical fiber.

* * * * *